Figure 1:
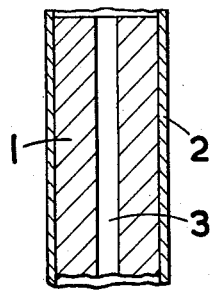

May 18, 1965  L. R. BLAKE  3,184,392
FAST NUCLEAR REACTOR FUEL ELEMENTS
Filed Aug. 17, 1960  2 Sheets-Sheet 1

INVENTOR
Leslie Reginald Blake
BY
Lawson and Taylor

May 18, 1965 L. R. BLAKE 3,184,392
FAST NUCLEAR REACTOR FUEL ELEMENTS
Filed Aug. 17, 1960 2 Sheets-Sheet 2

INVENTOR
Leslie Reginald Blake
BY
Lawson and Taylor

United States Patent Office 3,184,392
Patented May 18, 1965

3,184,392
FAST NUCLEAR REACTOR FUEL ELEMENTS
Leslie Reginald Blake, Thurso, Caithness, Scotland, assignor to United Kingdom Atomic Energy Authority, London, England
Filed Aug. 17, 1960, Ser. No. 50,213
Claims priority, application Great Britain, Aug. 17, 1959, 28,021/59
8 Claims. (Cl. 176—67)

This invention relates to nuclear reactor fuel elements of the kind comprising nuclear fuel enclosed within a protective sheath of generally cylindrical form.

The invention is particularly concerned with fuel elements for fast reactors, that is to say, reactors in which fission is caused predominantly by fast neutrons.

Economical power production from a fast reactor depends upon obtaining a fuel element of high burn-up, where burn-up is defined as the number of atoms fissioned divided by the total number of fissile and fertile atoms originally present. Thus, to produce power competitively with current designs of thermal reactors, a burn-up of about 1% is thought to be required. This may be done by using metal fuels with high alloy additions: 10% by weight molybdenum in uranium or uranium-plutonium, or ternary alloys. This alloy addition approach has disadvantages, for example:

(i) High burn-up can only be obtained with a low centre-temperature of about 650° C. maximum.
(ii) The alloying additions reduce thermal conductivity and this together with the low centre-temperature makes fuel elements small and expensive at the high power ratings necessary for low fuel investment.
(iii) Presence of the alloying addition reduces nuclear performance, in particular reducing the internal (core) breeding ratio.
(iv) The fuel is expensive to reprocess and refabricate as compared with unalloyed uranium.

These disadvantages have led to increased interest in cermet fuels based on $UO_2$ and $PuO_2$ in a steel matrix or in a $U_{238}$ or $U_{238}$-molybdenum matrix, and also in carbide fuels which are at present only in the very early stages of development. Although these cermet fuels may have a burn-up greater than 1%, again there are disadvantages, particularly:

(a) Substantially lower overall breeding ratio and a very much lower internal breeding ratio, and thus much larger reactivity changes with burn-up,
(b) An expensive powder metallurgy stage in refabrication, and
(c) Difficulties connected with reactor safety.

Uranium dioxide has a thermal conductivity about one-tenth of that of uranium metal, the thermal conductivity being further reduced by fine cracking which can take place under irradiation. This poor thermal conductivity removes any distinctive advantage that may be gained from the fact that $UO_2$ may be used at 1,700–2,000° C.

Whilst high burn-up is desirable, it should also be accompanied by lower reactor costs. Thus, it is possible that 1% burn-up with 10% by weight molybdenum in uranium may be no more economical than 0.3% burn-up with pure uranium, or uranium with a lower alloying addition of non-fissile metal due to greater expense in fuel reprocessing and refabrication as well as reduced nuclear performance.

The present invention, which is directed to providing an overall economic fuel element with good burn-up, is based on an inter-related combination of three features, namely, strong sheath, weakened fuel and expansion space of 10 to 30% within the sheath.

The present invention accordingly resides in a nuclear reactor fuel element of the kind comprising nuclear fuel enclosed within a protective sheath of generally cylindrical form wherein the sheath is of high tensile strength and high creep strength so as to be capable of withstanding an internal pressure of at least 10,000 p.s.i. at a temperature of 600° C., and the fuel occupies 70–90% of the fuel volume provided by the sheath, the unoccupied volume serving as expansion space for the fuel and also space for accommodation of fission products, on irradiation of the fuel.

Figure 4:
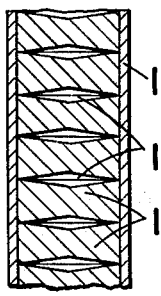
Figure 5:
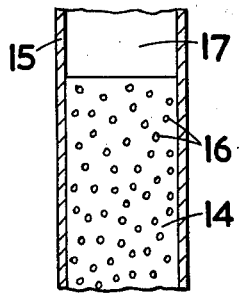
Figure 7:
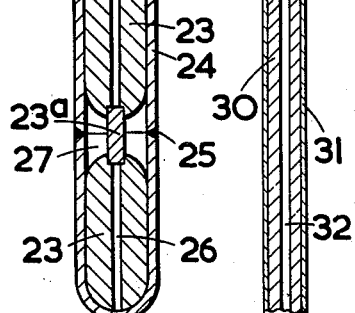
Figure 6:
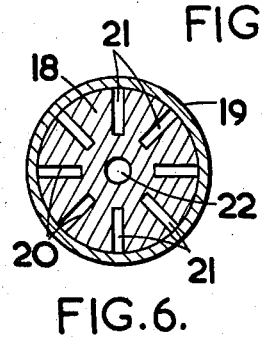
Figure 8:
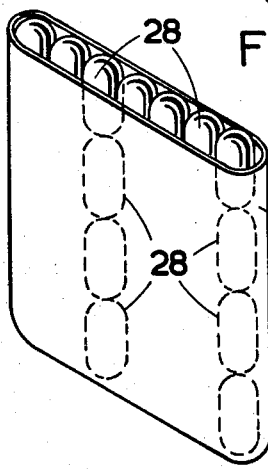
Figure 9:
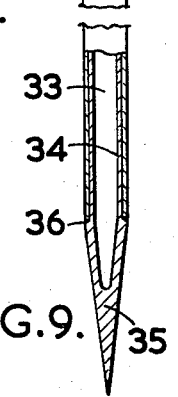
Figure 10:
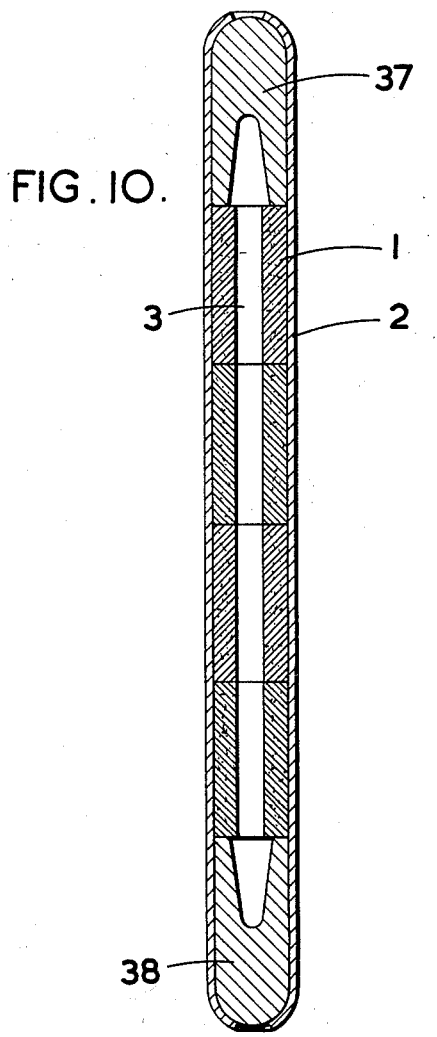

By way of example, various forms of fuel element according to the invention will now be described with reference to the accompanying drawings wherein:

FIGS. 1 to 5 are fragmentary sectional elevations,
FIG. 6 is a sectional plan view,
FIG. 7 is a sectional elevation of a fuel element capsule,
FIG. 8 is a perspective view of an assembly of capsules,
FIG. 9 is a sectional elevation of a complete fuel element, and
FIG. 10 is a sectional elevation of another fuel element.

In FIG. 1, a nuclear reactor fuel element comprises tubular nuclear fuel 1 enclosed within a cylindrical protective sheath 2, the fuel having an axial void 3 and being in intimate contact over its entire periphery with the inner surface of the sheath to establish the requisite thermal bond.

Figure 2:
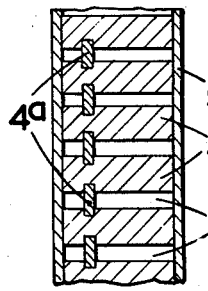

In FIG. 2, a nuclear reactor fuel element comprises a series of stacked nuclear fuel bodies in the form of plates 4 enclosed within a cylindrical protective sheath 5, the plates 4 being spaced apart by interposed pins 4a (three equispaced per disc) to provide voids 6.

Figure 3:
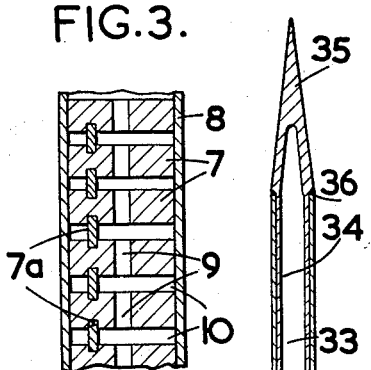

In FIG. 3, a nuclear reactor fuel element combines features of both FIGS. 1 and 2, and comprises annular nuclear fuel bodies in the form of plates 7 enclosed within a cylindrical protective sheath 8, the fuel element having axial voids 9 and the plates 7 being spaced apart by interposed pins 7a (three equispaced per plate) to provide voids 10.

In FIG. 4, a nuclear reactor fuel element comprises circular nuclear fuel bodies in the form of plates 11 enclosed within a cylindrical protective sheath 12, the plates 11 being recessed concavely or dished on opposite faces to provide voids 13.

In FIG. 5, a nuclear reactor fuel element comprises a body of porous nuclear fuel 14 which by virtue of the porosity is of dispersed structure and which is enclosed within a cylindrical protective sheath 15, the fuel 14 providing interstitial voids 16 and the fuel element being only partially filled to leave a void 17 above the fuel 14.

In FIG. 6 a nuclear reactor fuel element comprises a body of tubular nuclear fuel 18 enclosed within a cylindrical protective sheath 19, the fuel 18 having longitudinally extending radial slots 20 of narrow width providing voids 21 and the fuel having an axial void 22; the slots detract little on account of the narrow width from the completeness of the thermal bond between fuel and sheath.

In FIG. 7, a nuclear reactor fuel element capsule 28 comprises two tubular nuclear fuel bodies 23 enclosed within a cylindrical protective sheath 24, the sheath 24 being formed from two halves welded together at line 25. The fuel has axial voids 26 and the fuel bodies 23 are spaced apart by pins 23a to provide an intermediate void 27. FIG. 8 shows an assembly of fuel elements 28 in an open-ended flat can 29.

In FIG. 9, a nuclear reactor fuel element comprises a body of tubular fuel 30 enclosed within a protective sheath 31, the fuel element having an axial void 32 and voids 33 above and below fuel 30. The fuel element has conical end pieces 35 each having an integral sleeve 34 providing axial locations for the fuel 30, the end pieces 35 being welded to the sheath 31 at lines 36.

A specimen fuel element constructed in accordance with FIG. 1 is illustrated in its entirety in FIG. 10 wherein the same reference numerals are employed. The tubular fuel 1 is divided into four bodies in the form of pellets stacked one on top of another within the space enclosed by the cylindrical sheath 2 between end plugs 37 and 38. These plugs have rounded ends and the material of the cylindrical sheath 2, which is initially of a plain tubular shape, is swaged over these rounded ends for the relief during operation of stresses imposed on joints effected by spot welding between the plugs and the sheath. Helium or argon gas fills the unoccupied space within the element. A typical element has an outer diameter of one-eighth of an inch and a length of about 1⅝ inches. It is to be understood that constructions according to FIGS. 2 to 6 inclusive may be embodied in elements as shown in FIG. 10.

In the fuel elements described above with reference to the drawings, the nuclear fuel is uranium or plutonium metal, that is to say, without alloying additions of non-fissile material, and not of oxide or carbide form. The protective sheath material, and such end plugs as may be included, can be of the high tensile strength, high creep strength "Nimonic" (Ni, Cr, and Ni, Cr, Co) or "Inconel" (Ni, Cr, Fe) type alloys (e.g., "Nimonic" 90, 95 or 100, substantially 62% Ni, 20% Cr, 18% Co). These alloys are suitable for use in liquid sodium at 400–600° C. and can be used in conjunction with a refractory interlayer of niobium, vanadium, molybdenum or tantalum between the sheath and the nuclear fuel, the interlayer being provided as a coating on the inside of the sheath or on the outside of the nuclear fuel or both. The sheath may alternatively be of molybdenum, no interlayer then being required. The cylindrical sheaths preferably have an outer diameter within the range of 0.1 to 0.4 inch with a wall thickness to outer diameter ratio of 0.1, that is a corresponding wall thickness range of 0.01 to 0.04 inch. The voids provide expansion space into which the fuel can move by an irradiation growth and also space for fission product gases and solid fission fragments produced as result of fission of the fuel. In each of the fuel elements, the fuel occupies 70–90% of the available fuel volume provided by the sheath, the voids having a corresponding volume range of 30–10%.

Use of the high burn-up fuel elements of the invention in a fast reactor is attractive in that it provides for economic reactor operation through lower fuel cycle costs, lower fuel investment costs, high plutonium credit when using metal fuels, and lower operating costs due to less interference with reactor operation for refuelling.

I claim:

1. A fast reactor fuel element comprising a generally cylindrical nuclear fuel protective sheath defining an enclosed space, the sheath having a selected outer diameter from the range of between 0.1 to 0.4 inch and a corresponding wall thickness of at least one-tenth the selected outer diameter, the said sheath being of a nuclear fuel protective metal having a tensile strength and creep strength sufficient to withstand an internal pressure of at least 10,000 p.s.i. at a temperature of 600° C.; and nuclear fuel enclosed by and within said sheath and having a cross sectional shape to provide intimate contact of the fuel with said sheath over at least a major portion of the periphery of said shape, the fuel filling between 70% and 90% of the said space, 30% to 10% of the space being void in order to accommodate both expansion and fission products arising in said fuel on irradiation thereof.

2. A fuel element according to claim 1 wherein the nuclear fuel comprises a series of stacked fuel bodies.

3. A nuclear reactor fuel element according to claim 1, wherein the fuel is confined to within a portion only of the total interior length of said sheath.

4. A fuel element according to claim 2 and further comprising spaced pins interposed between the bodies to maintain the bodies in a spaced apart relationship.

5. A fuel element according to claim 2 wherein at least one of the faces of each of the bodies is recessed and said body is in engagement with an adjacent body by the edges bounding the recessed face.

6. A fuel element according to claim 1 wherein the fuel defines a plurality of spaced slots extending radially inwardly from the periphery of said fuel.

7. A fuel element according to claim 1 wherein the fuel is porous and dispersed to form interstitial voids.

8. A nuclear fuel element according to claim 2 wherein the spaced nuclear fuel bodies are tubular to define voids extending axially of the element.

References Cited by the Examiner

UNITED STATES PATENTS

| | | | |
|---|---|---|---|
| 2,864,758 | 12/58 | Shackelford | 176—83 |
| 2,873,853 | 2/59 | Burton. | |
| 2,969,313 | 1/61 | Grebe | 176—66 |
| 2,983,663 | 5/61 | Bassett | 176—68 |
| 2,984,613 | 5/61 | Bassett | 176—68 |
| 3,043,761 | 7/62 | Reynolds | 176—67 |
| 3,053,743 | 9/62 | Cain | 29—404 |

FOREIGN PATENTS

| | | |
|---|---|---|
| 210,690 | 10/57 | Australia. |
| 1,068,821 | 9/57 | Germany. |
| 794,901 | 5/58 | Great Britain. |

CARL D. QUARFORTH, *Primary Examiner.*

ROGER L. CAMPBELL, LEON D. ROSDOL,
*Examiners.*